United States Patent [19]

Aharoni

[11] 4,336,343
[45] Jun. 22, 1982

[54] POLYESTER MOLDING COMPOSITIONS HAVING INCREASED CRYSTALLIZATION TEMPERATURES

[75] Inventor: Shaul M. Aharoni, Morris Plains, N.J.

[73] Assignee: Allied Corporation, Morris Township, Morris County, N.J.

[21] Appl. No.: 277,417

[22] Filed: Jun. 25, 1981

[51] Int. Cl.³ .............................................. C08K 5/09
[52] U.S. Cl. .................................. 523/455; 525/439; 528/176; 528/272; 524/297; 524/308; 524/311; 524/292; 524/299; 524/381
[58] Field of Search ............................... 525/4, 5, 439; 260/40 R, 45.85 R, 45.7 R; 528/272, 176

[56] References Cited

U.S. PATENT DOCUMENTS

| | | | |
|---|---|---|---|
| 3,575,931 | 4/1971 | Sherman | 525/5 X |
| 4,096,202 | 6/1978 | Farnham et al. | 260/40 R X |
| 4,131,595 | 12/1978 | Breitenfellner et al. | 260/40 R |
| 4,157,325 | 6/1979 | Charles et al. | 260/40 R |
| 4,215,032 | 7/1980 | Kobayashi et al. | 260/40 R |
| 4,257,937 | 3/1981 | Cohen et al. | 525/439 X |
| 4,284,540 | 8/1981 | Iida et al. | 525/5 X |
| 4,305,864 | 12/1981 | Griffin et al. | 528/272 X |

Primary Examiner—Lucille M. Phynes
Attorney, Agent, or Firm—Alan M. Doernberg; Gerhard H. Fuchs; Richard C. Stewart, II

[57] ABSTRACT

A polyester based composition comprising sodium citrate as a nucleating agent.

22 Claims, No Drawings

POLYESTER MOLDING COMPOSITIONS HAVING INCREASED CRYSTALLIZATION TEMPERATURES

BACKGROUND OF THE INVENTION

1. Field of the Invention

This invention relates to modified thermoplastic linear polyester compositions which are useful as molding compositions. More particularly, this invention relates to modified polyester based molding compositions which comprises an effective amount of sodium citrate which functions to facilitate the formation of a shaped, molded article having improved surface characteristics by increasing the crystallization temperature of the polyester.

2. Description of the Prior Art

Thermoplastic polyesters, such as poly(ethylene terephthalate), and poly(butylene terephthalate), can be produced on a large scale at relatively low cost, and have found extensive use in the production of synthetic fibers. However, unmodified polyesters have not been exploited as molding resins because of certain inherent disadvantages, as for example insufficient toughness for that utility; and a lack of dimensional stability when heated to elevated temperatures.

Accordingly, for various applications, it is now desirable to modify or improve the molding properties of various polyesters, and for this purpose various additives have been incorporated into polyesters. For example, the strength, dimensional stability and hardness of polyesters can be enhanced by incorporating reinforcing materials, such as glass fibers, asbestos fibers, or other fibrous materials.

However, while effective to a limited extent, incorporation of such fibrous materials provide certain other disadvantages. For example, when employing such fibrous strenghtening materials, it is necessary to use very high mold temperatures, i.e., temperatures in the range of from about 130° C. to about 180° C., to obtain good release of the molded article from the mold, and to obtain molded articles which possess a glossy surface appearance, and surfaces which are not rough in texture. While good surface characteristics, i.e., high gloss, and smooth texture, can be obtained at molding temperatures of about 130° C. or more, the use of such high temperatures are not practicable in the molding field, because most molds are heated with water, and can obtain molding temperatures of only from about 77° C. to about 110° C. A few molding devices which employ heating means such as oil can attain higher molding temperatures, however, these devices are generally inconvenient and hard to use, and still either do not attain the desired higher temperatures, or attain them unevenly because of inadequate coring.

Because of these heating difficulties, it is desirable and there is a need for a polyester based molding composition capable of being molded at lower temperatures i.e., from about 85° C. to about 100° C.; yet which still provides a molded product having good physical properties such as high flexural strength, modulus, tensile strength and impact strength; good finished appearance and mold release characteristics, and high melt flow index for sufficient flow into the mole. In order to accomplish these goals, it is necessary for crystallization of the polyester to begin at as high a temperature as possible upon cooling of the polyester in the mold and that crystallization of the amorphous polymer began at as low a temperature as possible. Various prior art references disclose that nucleating agents can be used with a crystallizable polyester, as for example linear saturated polyesters of aliphatic diols and aromatic carboxylic acids, so that the polyester can be molded at mold tempertures of below about 110° C. and still provide a molded article having a smooth and glossy surface. For example, U.S. Pat. Nos. 3,435,093; 3,516,957; and 3,639,527; and Netherlands Patents Nos. NL 79-01605 and NL 79-01609, generally disclose the use of copolymers of $\alpha,\beta$-unsaturated olefins and $\alpha,\beta$-unsaturated carboxylic acid, as for example, ethylene/methacrylic acid copolymer, in which all or portion of the pendant carboxyl functions have been neutralized forming the alkali metal salt of the copolymer, as nucleating agents for the aforesaid purpose. While relatively effective, there are various disadvantages associated with the use of these prior art nucleating agents. For example, such agents provide a reduced melt index making it harder to fill thin cross-sections in complicated shapes.

SUMMARY OF THE INVENTION

In accordance with this invention, there is provided a molding composition, based on a linear polyester, wherein the crystallization temperature (Tcc) of the polyester in the composition, i.e., the temperature at which crystals first appear upon cooling of the melt, is greater than the standard Tcc of the polyester, i.e., the Tcc of the polyester in the absence of additives. The novel molding composition of this invention comprises: a polyester; and sodium citrate, wherein the quantity of sodium citrate is such that the crystallization temperature of said composition is greater than the crystallization temperature of said polyester.

This invention also provides molded articles of manufacture which comprise the molding composition of this invention. Such molded articles have good physical properties including flexual strength, modulus, tensile strength and impact strength, as well as good molding properties such as a high melt flow index for sufficient flow into the mold, good mold release properties, and good finished surface appearance and texture when molded at relatively low mold temperatures.

In another aspect, this invention is directed to a method for modifying the crystallinity characteristics of polyester compositions. More particularly, this invention relates to a process for increasing the crystallization temperature of a polyester which comprises adding to said polyester an amount of sodium citrate sufficient to increase said crystallization temperature.

DETAILED DESCRIPTION OF THE INVENTION

As an essential component, the molding composition of this invention includes a linear polyester. The type of polyester is not critical and the particular polyester chosen for use in any particular situation will be dependent essentially on the physical properties and features, i.e. flexibility, hardness, toughness, desired in the final molded article of manufacture. Thus, a multiplicy of linear thermoplastic polyesters having wide variations in physical properties are suitable as components of the molding compositions of this invention.

The particular polyester chosen for use can be a homo-polyester or a co-polyester, or mixtures thereof as desired. Polyesters are normally prepared by the condensation of an organic dicarboxylic acid and an organic diol, and, therefore, illustrative examples of useful polyesters will be described hereinbelow in terms of these diol and dicarboxylic acid percursors.

Polyesters which are suitable for use in this invention are those which are derived from the condensation of aromatic, cycloaliphatic, and aliphatic diols with aliphatic, aromatic and cycloaliphatic dicarboxylic acids. Illustrative of useful aromatic diols, are those having from about 6 to about 12 carbon atoms. Such aromatic diols include bis-(p-hydroxyphenyl) ether; bis-(p-hydroxyphenyl) thioether; (bis-(p-hydroxyphenyl)-sulphone; (bis-(p-hydroxyphenyl)-methane; 1,2-(bis-(p-hydroxyphenyl)-ethane; 1-phenyl-(bis-(p-hydroxyphenyl)-methane; diphenyl-(bis-(p-hydroxyphenyl)-methane; 2,2-bis(4'-hydroxy-3'-dimethylphenyl)propane; 1,1- or 2,2-(bis-(p-hydroxyphenyl)-butane; 1,1-dichloro- or 1,1,1-trichloro-2,2-(bis-(p-hydroxyphenyl)-ethane; 1,1-(bis-(p-hydroxyphenyl)-cyclopentane; 2,2-(bis-(p-hydroxyphenyl)-propane (bisphenol A); 1,1-(bis-(p-hydroxyphenyl)-cyclohexane (bisphenol C); p-xylene glycol; 2,5-dichloro-p-xylylene glycol; p-xylene$\alpha,\alpha$-diol; and the like.

Suitable cycloaliphalic diols include those having from about 5 to about 8 carbon atoms. Exemplary of such useful cycloaliphatic diols are 1,4-dihydroxy cyclohexane; 1,4-dihydroxy methylcyclohexane; 1,3-dihydroxycyclopentane; 1,5-dihydroxycycloheptane; 1,5-dihydroxycyclooctane; 1,4-cyclohexane dimethanol; and the like.

Polyesters which are derived from aliphatic diols are preferred for use in this invention. Useful and preferred aliphatic diols include those having from about 2 to about 12 carbon atoms, with those having from about 2 to about 6 carbon atom being particularly preferred. Illustrative of such preferred diol percursors are 1,2- or 1,3-propylene glycol; ethylene glycol, neopentyl glycol, pentyl glycol, 1,6-hexanediol, 1,4-butanediol and geometrical isomers thereof. Propylene glycol, ethylene glycol and 1,4-butanediol are particular preferred as diol precursors of polyesters for use in the conduct of this invention.

Suitable dicarboxylic acids for use as precursors in the preparation of useful polyesters are linear and branched claim saturated aliphatic dicarboxylic acids, aromatic dicarboxylic acids and cycloaliphatic dicarboxylic acids. Aliphatic dicarboxylic acids which can be used are those having from about 2 to about 50 carbons atoms, as for example, oxalic acid, malonic acid, dimethylmalonic acid, succinic acid, octadecylsuccinic acid, pimelic acid, adipic acid, trimethyladipic acid, sebacic acid, subric acid, azelaic acid and dimeric acids (dimerisation products of unsaturated aliphatic carboxylic acids such as oleic acid) and alkylated malonic and succinic acids, such as octadecylsuccinic acid, and the like.

Suitable cycloaliphatic dicarboxylic acids are those having from about 6 to about 15 carbon atoms. Such useful cycloaliphatic dicarboxylic acids include 1,3-cyclobutanedicarboxylic acid, 1,2-cyclopentanedicarboxylic acid, 1,3- and 1,4-cyclohexanedicarboxylic acid, 1,3- and 1,4-dicarboxymethylcyclohexane and 4,4'-dicyclohexyldicarboxylic acid, and the like.

Polyester compounds prepared from the condensation of a diol and an aromatic dicarboxylic acid are preferred for use in this invention. Illustrative of such useful aromatic carboxylic acids are terephthalic acid, isophthalic acid and o-phthalic acid, 1,3-, 1,4-, 2,6 or 2,7-naphthalenedicarboxylic acid, 4,4'-diphenyldicarboxylic acid, 4,4'-diphenylsulphone-dicarboxylic acid, 1,1,3-trimethyl-5-carboxy-3-(p-carboxyphenyl)indane, diphenyl ether 4,4'-dicarboxylic acid bis-p-(carboxyphenyl)methane and the like. Of the aforementioned aromatic dicarboxylic acids based on a benzene ring such as terephthalic acid, isophthalic acid orthophthalic acid are preferred for use and amongst these preferred acid precursors, terephthalic acid is particularly preferred.

In the most preferred embodiments of this invention poly(ethylene terephthalate), poly(butylene terephthalate), and poly(1,4-cyclohexane dimethylene terephthalate), are the polyesters of choice. Among these polyesters of choice, poly(ethylene terephthalate) is most preferred.

The polyester component need not be absolutely pure, and can contain impurities provided that they do not substantially adversely affect the physical characteristics of the composition. In the preferred embodiments of this invention the weight percent of such impurities will not be greater than about 5, and the major portion of these impurities will be comonomers such as ethylene glycol, 1,4-butanediol, 1,4-dehydroxymethyl cyclohexane, glutaric acid, adipic acid and the like.

The intrinsic viscosity of the polyester component is not critical to the crystallization temperature elevating characteristic of this invention. Polyethylene terephthalate and other polyesters for use in the preferred embodiments of this invention will preferably have an intrinsic viscosity range in the range of from about 0.4 to about 1.00, with a most preferred intrinsic viscosity in the range of from about 0.45 to about 0.6. Intrinsic viscosity is obtained by extrapolation of viscosity values to zero concentration of solutions of polyethylene terephthalate in a 60 to 40 volume ratio of phenol and tetrachloroethanol. The measurements are normalized to 25° C.

Polyesters suitable for use in the practice of this invention can be obtained from commercial sources, or prepared in accordance with known preparative techniques. For example, poly(ethylene terephthalate) the most preferred polyester for use in the preferred embodiments of this invention is commercially available from Aldrich Chemical Company in a variety molecular weights. Similarly, preferred and useful polyester such as polybutylene terephthalate) and poly-(1,4-cyclohexane dimethylene terephthalate) are commercially available from Aldrich Chemical Company.

As a second essential component, the molding composition of this invention includes "sodium citrate" in which all or a portion of the three carboxyl functions have been neutralized with sodium cations ($Na^+$). The sodium citrate may be employed in the hydrated form as for example the penta-, and di-hydrates, or in the anhydrous form. In the preferred embodiments of this invention, all carboxylic functions of sodium citrate will be neutralized with sodium cations, and the sodium citrate will be in the anhydrous form. Sodium citrate for use in this invention is a well known compound, whose physical properties are well documented in the literature, as for example "CRC Handbook of Chemistry and Physics," 58th Edition, Editor Robert C. Weast CRC Press Inc., Cleveland, Ohio (1977–1978). Sodium citrate is available as crystals, pellets, sticks, powders or the like from commercial sources. For example reagent, practical, and technical grades of sodium citrate are commercially available, as for example from Aldrich Chemical Company. The grade of sodium citrate employed in the conduct of this invention is not citrate and any of the aforementioned grades can be used effectively. Thus, the sodium citrate component need not be absolutely pure and can have up to 5 weight percent of impurities such as citric acid, and the like based on the total weight of the polyester component without adversely effecting the physical and chemical properties of the composition of this invention.

The quantity of sodium citrate in the composition is critical, and the composition should include at least an "effective amount". As used herein an "effective amount" is equal to or greater than the minimum quantity of sodium citrate required to increase the crystallization temperature of the polyester component by any amount, such that the crystallization temperature (Tcc) of the molding composition is greater than the crystallization temperature of polyester component. As is apparent from the foregoing definition, the "effective amount" may not be the same for each embodiment of this invention and may vary when different polyesters are employed or when different amounts are employed. The crystallization temperature, (Tcc) as mentioned hereinabove, is the temperature at which crystal formation is first observed. This temperature (Tcc) is measured by weighing about 7 milligrams of the compositions whose Tc is being measured, and placing this sample into a Differential Scanning Calorimeter. The sample is heated from temperature to about 300° C. at a rate of 10° C. per min. The sample is then held at 300° C. for 5 minutes, and is then cooled at a rate of 10° C./min and the crystallization temperature is given as the apex of the exothermic peak.

The magnitude of the increase in crystallization temperature obtained with a specific amount of sodium citrate may vary depending on the particular polyester component used. As a general rule, however, the greater the increase in crystallization temperature desired, the greater the quantity of sodium citrate required; and, conversely, the less the increase in crystallization temperature desired the less the amounts of sodium citrate required. However, when employing large amounts of sodium citrate care should be taken, because in some embodiments of the invention, large amounts of sodium citrate may adversely affect properties of the composition other than the crystallization temperature. Thus, by adding small amounts of sodium citrate, the crystallization temperature can be increased by fractions of a centigrade degree, and the quantity of sodium citrate employed can be increased causing an increase in the crystallization temperature up to 5, 10 or 30 centigrade degrees, or more, as desired. As was noted hereinabove, at least one utility of the present invention is to provide a molding composition having a crystallization temperature such that the composition can be molded in a water heated mold and yet still provide a molded product having acceptable surface characteristics. When employing the composition of this invention for the aforementioned purpose, the quantity of sodium citrate employed should be sufficient to increase the crystallization temperature of the molding composition such that such a product is provided. In the embodiments of this invention which employ the preferred polyester component as for example a condensation product of an aromatic dicarboxylic acid, and either an aliphatic or a cycloaliphatic diol, the quantity of sodium citrate used will normally be in the range of from about 0.01 to about 5 weight percent and in the particularly preferred embodiments from about 0.1 to about 3.0 weight percent based on the total weight of polyester in the composition. Amongst these particularly preferred embodiments, those which are most preferred will include from about 0.3 to about 2.0 weight percent sodium citrate on the same basis.

In addition to the above-described essential components, the molding composition of this invention can include various optional components which are additives commonly employed with polyester resins. Such optional components include fillers, plasticizers, impact modifiers, chain extenders, colorants, mold release agents, antioxidants, ultra violet light stabilizers, lubricants, antistatic agents, fire retardants, and the like. These optional components are well known to those of skill in the art, accordingly, only the preferred optional components will be described herein in detail.

The molding composition of this invention preferably includes a fiber glass or some other particulate filler, which functions to increase the modulus and stiffness of the composition, and provides a more economical composition. Any conventional filler can be employed provided that it provides all or a portion of the above-identified functions, and does to otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and materials thereof. Examples of such useful fillers include alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, etc. such fillers are well known materials and are readily available. The foregoing recited fillers are illustrative only and are not meant to limit the scope of the fillers that can be employed in this invention. In the preferred embodiments of this invention fibrous materials are the fillers of choice, and glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polyester component, and in the particularly preferred embodiment is in the range of from about 30 to about 90 weight percent on the same basis.

It is also very desirable to include a plasticizer in the composition of this invention, and such will be included in the preferred embodiments. The plasticizer allows crystallization to amorphous areas of the polyethylene terephthalate to continue at lower temperatures than if a plasticizer is not used. This is particularly important in low temperature molding where the mold temperature is below the temperature at which crystallization is expected to stop. For pure polyethylene terephthalate the polyester of choice in the particularly preferred embodiments of this invention, this temperature is about 125° C. (257° F.). It has been found The plasticizers which can be used with the composition of the present invention are of the type known in the art which can be used with linear saturated polyester molding compositions preferably polyethylene terephthalate. A nonlimiting group of plasticizers which can be used are found in Dutch Pat. Nos. NL 79-01605 and NL 79-01609. The plasticizer disclosed are organic esters. The organic esters can be the product of an aromatic carboxylic acid of 7-11 carbon atoms containing like, and an α,β-unsaturated carboxylic acid such as acrylic acid, methacrylic acid and the like, and in which all or a portion of the pendant carboxyl groups have been neutralized with univalent to trivalent metal cations are employed as impact modifiers. Included within the scope of the aforementioned generic description are such ionic copolymers or ethylene/acylic acid/$Na^{30}$, ionic compolymer; ethylene/methacrylic acid/$Na^+$ ionic copolymers, and the like. A particularly preferred impact modifier, is an ionic copolymer of ethylene/methacrylic acid/$Na^+$, which is marketed by Dupont Corporation of Wilmington, Del under the trademark Surlyn ®. The composition will include up to about 10 weight percent, and preferably from about 2 to about 6 weight percent of the impact modifier based on the total weight of the polyester.

The molding composition of this invention may also include a polyepoxide which functions as a drain extender and helps to compensate for polyester chains which are broken by hydrolysis. Illustrative of epoxy resins which can be used include as an epoxy formed from bisphenol-A and glycidyl ether, or polyepoxides obtained by reacting othocresol novalac and epichloroydrin. Preferred polyepoxides are epoxy cresol novalac resins which are commercially available under the trade designation ECN 1245, 1273 and 1299 from Ciba-Geigy Corporation. Preferably, there is up to about 3 percent and more preferably 0.1% to about 0.5% weight percent of polyepoxide based on the total weight of the polyester component.

The molding composition of this invention can be further modified by the addition of one or more pigments. Illustrative of useful pigments are iron oxide, cadmium red, rhodamine, chrome yellow, chrome green, and phthalocyanine blue.

The molding composition of this invention can be prepared by blending or mixing the essential ingredients, and other optional components, as uniformly as possible employing any conventional blending means. Appropriate blending means, such as melt extrusion, batch melting and the like, are well known in the art, and will not be described herein in great detail. In one useful procedure, the blending procedure can be carried out at elevated temperatures above the melting point of the polyester and the sodium citrate in a suitable form as for example, granules, pellets and preferrably powders, is added to the melt with vigorous stirring. Stirring is continued until a homogenous composition is formed. The sodium citrate can also be added to the melt coated on the surface of small particle inert powders which have a high surface volume ratios. The use of such inert powders, as for example fused silica, fused alumina, carbon black and aerogels, and hydrogels of silica or alumina, helps to reduce the amount of sodium citrates required to provide optimum results. Accordingly, such powders will be employed in the conduct of the preferred embodiments of this invention. Blending temperatures and blending pressures, and the order of addition of the various components are not critical and may be varied as desired provided that a sustantially homogeneous composition results. The blending procedure can be carried out at elevated temperatures, in which case the polyester component is melted and the solid sodium citrate is admixed therewith by vigorously stirring the melt. Similarly, the various solid components can be granulated, and the granulated components mixed dry in a suitable blender, or for example a Branbury mixer, as uniformly as possible, then melted in an extruder and expressed with cooling.

Alternatively, the composition of this invention can be formulated by dissolving the components in an appropriate inert solvent, after which the solvent is removed by evaporation, or other conventional solvent removing means are employed to provide the composition. The solvent is not critical, the only requirements being that it is inert to the components of the composition, and it is capable of solubilizing the various components, or at least forming dispersions thereof.

The molding compositions according to the invention can be partially crystalline to amorphous, depending on which individual constituents are employed. They are thermoplastic materials from which moulded articles of manufacture having valuable properties can be produced by the conventional shaping processes, such as casting, injection moulding and extruding. Examples of such mouldings are components for technical equipment, apparatus castings, household equipment, sports equipment, components for the electrical and electronics industries and electrical insulations, car components, circuits, fibers and semi-finished products which can be shaped by machining. The use of the materials for coating articles by means of immersion or powder coating processes is also possible, as is their use as hot-melt adhesives. The molding compositions according to the invention are outstandingly suitable for specific applications of all types since their spectrum of properties can be modified in the desired direction in manifold ways.

The molding compositions according to the invention are oustandingly suitable for the production of sheets and panels having valuable properties. The sheets and panels according to the inventions are suitable as coating materials for other materials comprising, for example, wood, glass, ceramic, metal or other plastics, and outstanding strengths can be achieved using conventional adhesion promoters, for example based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, for example by lacquering or by the application of protective films.

The following specific examples are presented to more particularly illustrate the invention, and should not be construed as being limitations on the scope and spirit of the invention.

EXAMPLE 1

Into an oven maintained at a temperature of greater than 150° C. was charged sodium citrate which had been obtained commercially from Aldrich Chemical Company. The sodium citrate was heated for a time sufficient to eliminate the water of hydration. Into a 1 inch single screw extruder was charged 500 grams of ground powdered poly(ethylene terephthalate) having an intrinsic viscosity of 0.95 obtained from Aldrich Chemical Company and 2.1 g of dried sodium citrate as a ground powder. The components were then melt blended at a temperature of from about 275° C. to about 280° C. for about 5 mins. The composition had a sodium citrate content of about 0.42 weight percent based on the total weight of the composition. The composition was allowed to cooled and the crystallization temperature was evaluated in the manner indicated hereinabove. Crystallization temperature was 211° C. which was 21° C. higher than the crystallization temperature (Tcc) of poly(ethylene terephthalate) which did not include a nucleating agent.

EXAMPLES 2

Employing the procedure of EXAMPLE 1, a composition of this invention was prepared by extruding a mixture of 500 grams of poly(ethylene terephthalate) and 2.1 g of sodium citrate. The resulting composition which included about 0.42 weight percent sodium citrate based on the total weight of the composition had a crystallization temperature of about 207° C. which is 17° C. higher than the crystallization temperature of untreated poly(ethylene terephthalate).

EXAMPLES 3 TO 10

The following summarizes examples of preferred filled compositions of the present invention. The parts are percents based on 100 parts of the composition. The plasticizers are neopentyl glycol dibenzoate and dioctyl adipate. The epoxy used is the reaction product of orthocresol novolac and epichlorohydrin, ECN 1273 manufactured by Ciba-Geigy. A small amount of sodium stearate can be added to help mold release. The compositions of EXAMPLES 3 to 10 are prepared in accordance with the procedure of EXAMPLE 1, except that the optional components are added to the screw extruder prior to melt blending the percent composition of these compositions are set forth in TABLE 1, hereinbelow.

TABLE I

| | Example No. and % Composition | | | | | | | |
|---|---|---|---|---|---|---|---|---|
| Component | 3 | 4 | 5 | 6 | 7 | 8 | 9 | 10 |
| A. Polyester | | | | | | | | |
| (1) polyethylene (terephthalate) | 67.2 | | | | 66.3 | 62.22 | | |
| (2) poly(butylene) (terephthalate) | | 54.9 | 43.5 | | | | 45.4 | 56.3 |
| (3) poly(1,4-cyclo-hexane dimethylene terephthalate) | | | | 58.2 | | | | |
| B. Sodium Citrate | .01 | .4 | .9 | 1.0 | 5 | .08 | 2.0 | .10 |
| C. Plasticizers | | | | | | | | |
| (1) dioctyl odipate | 2 | | 5 | 10 | | | | 8 |
| (2) neopentyl glycol dibenzoate | | 4 | | | 3 | 6 | 7 | |
| D. Fiberglass | 30 | 40 | 50 | 30 | 35 | 30 | 45 | 35 |
| E. Epoxy | .3 | .3 | .3 | .3 | .3 | .3 | .3 | .1 |
| F. Sodium Stearate | .4 | .4 | .3 | .5 | .4 | .5 | .3 | .5 |

The foregoing detailed description of the invention has been given for clearness of understanding only, and no necessary limitations are to be inferred therefrom. The invention is not limited to the exact details herein shown and described, and will encompass obvious modifications which will occur to those of skill in the art in light of the appended claims.

What is claimed is:

1. A molding composition comprising:
a polyester; and
sodium citrate, wherein the quantity of sodium citrate is selected such that the crystallization temperature of said composition is greater than the crystallization temperature of said polyester.

2. A molding composition according to claim 1 wherein said polyester is the condensation product of a benzene based aromatic dicarboxylic acid; and a diol selected from the group consisting of aliphatic diols having from about 2 to about 6 carbon atoms, and cycloaliphatic diols having from about 6 to about 12 carbon atoms.

3. A composition according to claim 2 wherein said polyester is selected from the group consisting of poly(ethylene terephthalate), poly(butylene terephthalate), poly(1,4-cyclohexane dimethylene terephthalate) or mixtures thereof.

4. A composition according to claim 3 wherein said polyester had an intrinsic viscosity in the range of from about 0.4 to about 1.0.

5. A composition according to claim 1 or 4 wherein said polyester is poly(ethylene terephthalate).

6. A composition according to claim 5 wherein said composition comprises from about 0.01 to about 5.0 weight percent of said sodium citrate based on the total weight of said composition.

7. A composition according to claim 6 wherein the weight percent of sodium citrate is in the range of from about 0.1 to about 3.0 weight percent.

8. A composition according to claim 7 wherein said weight percent of sodium citrate is in the range of from about 0.3 to about 2.0.

9. A composition according to claim 5 wherein the crystallization temperature of said composition is in the range of from about 5 to about 30 Centigrade degrees higher than the crystallization temperature of said polyester.

10. A composition according to claim 1 wherein said composition includes one or more optional component selected from the group consisting of a filler, impact modifier, plasticizer and chain extender.

11. A composition according to claim 10 which compares up to 150 weight percent of a filler selected from the group consisting of glass fibers, asbestos fibers and a mixture thereof, wherein all weight percents are based on the total weight of the composition.

12. A composition according to claim 10 which comprises from about 30 to 90 weight percent of glass fiber, based on the total weight of the polyester.

13. A composition according to claim 10, 11 or 12 which comprises up to about 15 weight percent of a plasticizer, wherein said weight percent is based on the total weight of the polyester.

14. A composition according to claim 13 which comprises from about 2 to about 10 weight percent of a plasticizer.

15. A composition according to claim 14 which comprises up to 10 weight percent of an impact modifier based on the total weight of the polyester.

16. The composition as recited in claim 15 to wherein there is from about 2% to about 6% of an impact modifier selected from the group consisting of: ethylene acrylic acid copolymer, ethylene methacrylic acid copolymer, ethylene ethylacrylate, ethylene vinyl acetate; and mixtures thereof.

17. A composition according to claim 10 which comprises up to 3 weight percent of a chain extender based on the total weight of the polyester.

18. A composition according to claim 12 wherein said chain extender is an epoxy resin.

19. The composition as recited in claim 14 wherein the plasticizer is selected from the group consisting of: dioctyl adipate, neopentyl glycol dibenzoate, triethylene glycol dibenzoate, trimethylolethylene tribenzoate, and pentaerythretol tetrabenzoate.

20. A composition comprising:

poly(ethylene terephthalate) having an intrinsic viscosity in the range of from about 0.4 to about 1.0;
from about 0.01 to about 5.0 weight percent of sodium citrate;
from about 30 to about 90 weight percent of a filler;
from about 2.0 to about 10.0 weight percent of a plasticizer;
from about 2.0 to about 6.0 weight percent of an impact modifier; and
from about 0 to about 3.0 weight percent of a chain extender;
wherein all weight percents are based on the total weight of poly(ethylene terephthalate) in the composition.

21. A molded article of manufacture comprising a composition in accordance with each of claims 1 to 20.

22. A method of increasing the crystallization temperature of a linear polyester which comprises adding to said polyester an amount of sodium citrate sufficient to increase said crystallization temperature.

* * * * *